(12) United States Patent
Suh (10) Patent No.: US 8,903,647 B2
(45) Date of Patent: Dec. 2, 2014

(54) APPARATUS AND METHOD FOR PERFORMING MAP MATCHING

(71) Applicant: Hyundai Mnsoft, Inc., Seoul (KR)

(72) Inventor: Dong Kwon Suh, Seoul (KR)

(73) Assignee: Hyundai Mnsoft, Inc., Seoul (KR)

( * ) Notice: Subject to any disclaimer, the term of this patent is extended or adjusted under 35 U.S.C. 154(b) by 78 days.

(21) Appl. No.: 13/693,118

(22) Filed: Dec. 4, 2012

(65) Prior Publication Data

US 2013/0151140 A1  Jun. 13, 2013

(30) Foreign Application Priority Data

Dec. 12, 2011 (KR) .................. 10-2011-0133141

(51) Int. Cl.
- *G01C 21/00* (2006.01)
- *G01C 21/20* (2006.01)
- *G01C 21/30* (2006.01)

(52) U.S. Cl.
CPC ............ *G01C 21/005* (2013.01); *G01C 21/206* (2013.01); *G01C 21/30* (2013.01)
USPC ........................................................ 701/411

(58) Field of Classification Search
None
See application file for complete search history.

(56) References Cited

U.S. PATENT DOCUMENTS

| | | | |
|---|---|---|---|
| 2008/0306689 A1* | 12/2008 | Kourogi et al. | 701/217 |
| 2010/0023251 A1* | 1/2010 | Gale et al. | 701/201 |
| 2011/0269479 A1* | 11/2011 | Ledlie | 455/456.1 |
| 2011/0306354 A1* | 12/2011 | Ledlie et al. | 455/456.1 |
| 2012/0098868 A1* | 4/2012 | Nagasaka | 345/684 |
| 2012/0130632 A1* | 5/2012 | Bandyopadhyay et al. | 701/446 |
| 2013/0151140 A1* | 6/2013 | Suh | 701/411 |

FOREIGN PATENT DOCUMENTS

| | | |
|---|---|---|
| JP | 2002-318121 | 10/2002 |
| KR | 10-2010-0067578 | 6/2010 |

* cited by examiner

*Primary Examiner* — Thomas Tarcza
*Assistant Examiner* — Adam Alharbi
(74) *Attorney, Agent, or Firm* — Bacon & Thomas, PLLC

(57) ABSTRACT

An apparatus performs a space map matching on a position of a user terminal measured through a positioning process and display the measured positions of the user terminal on a map in which a plurality of spaces are constructed. The space map matching is performed to determine in which space the user terminal is located among the plurality of spaces.

15 Claims, 4 Drawing Sheets

APPARATUS AND METHOD FOR PERFORMING MAP MATCHING

FIELD OF THE INVENTION

The present invention relates to an apparatus and method for performing a map matching of a position of a user terminal, and more particularly, to an apparatus and method for performing an indoor map matching to display on an indoor map a position of a user terminal measured using a positioning infrastructure device.

BACKGROUND OF THE INVENTION

Navigation systems are widely used for vehicles. A navigation system identifies a current position of a vehicle or a user in real time by calculating coordinate signals received from Global Positioning System (referred to as 'GPS', hereinafter) satellites and indicates the current position onto a map image by interlocking the current position with the database with map information and traffic information built previously. The navigation system for a vehicle employs a GPS receiver to calculate a current position of a vehicle. The navigation system obtains information on current speed, time and position of the vehicle by virtue of the GPS receiver and provides a user with guidance information based on such information.

However, when calculating the current position using GPS signals, there normally occurs an error of tens of meters because of characteristics of the GPS signals, which results in that the navigation system displays the current position on an erroneous point, such as a position out of road or a building, on a map.

In order to avoid such a problem, a conventional navigation system applies a map matching method to calculate a position of the vehicle. According to the map matching method, a current position of a vehicle and road data are compared each other under the assumption that the vehicle is driving on the road. Further, when the difference between the current position and coordinate data is within a predetermined range, it is determined that the vehicle is driving on the road and the current position is forcibly corrected into a point on the road data nearest the current position.

Korean Laid-Open Patent No. 10-2010-0067578 suggests an apparatus and method for map matching of a moving object. The Korean Laid-Open Patent No. 10-2010-0067578 discloses a map matching method to correct a position coordinate of a moving object such as a vehicle moving on a road, wherein a position of the moving object is corrected into a point on the road when coordinate data of the road does not exist on a map data and thus it is not easy to make a conventional map matching.

Japanese Laid-Open Patent No. 2002-318121 discloses a navigation system, which is capable of determining a current position of a moving object when the moving object moves into an indoor facility. First, the navigation system determines a current position of the moving object by performing a map matching on an output data from a stand-alone sensor and an output data from a GPS apparatus using a map data while the moving object is moving. Thereafter, when it is detected that the current position of the moving object is located within an indoor facility, the navigation system performs a map matching on the output data from the stand-alone sensor using a map data to determine the current position of the moving object.

Generally, in case that positioning information of a user is received, a position of the user is displayed by making a map matching to road network data (node or link, for example) nearest to the position. However, in case that the user is placed at an indoor location, especially, at a specific space in a building, a positioning result is map-matched to the nearest network data, which results in that it is not possible to precisely reflect a real position of the user on the map.

SUMMARY OF THE INVENTION

In view of the above, the present invention provides a method for map matching a position of a user terminal on an indoor map.

Further, the present invention provides a method for map matching a position of a user terminal on an indoor map in different methods according to information requested by a user.

Further, the present invention provides a method for map matching a position of a user terminal on an indoor map in different methods according to entities to store position information of a positioning infrastructure device used to measure the position of the user terminal.

In accordance with an aspect of the present invention, there is provided an apparatus configured to perform a space map matching using a position of a user terminal measured through a positioning process and display the measured position of the user terminal on a map in which a plurality of spaces are constructed, wherein the space map matching is performed to determine in which space the user terminal is located among the plurality of spaces.

In accordance with another aspect of the present invention, there is provided a map server including: a communication unit configured to receive an intensity of receiving signal from a user terminal, the intensity of receiving signal being obtained by communicating with a positioning infrastructure device; a storage unit storing position information of the positioning infrastructure device; and a control unit configured to measure a position of the user terminal using the intensity of receiving signal and position information of the positioning infrastructure device, and perform a space map matching or a network map matching on the position of the user terminal.

According to the space map matching method of the embodiment, a position of a user terminal measured by a positioning infrastructure device is more correctly displayed on a map compared with a conventional network-based map matching method. Further, the position of the user terminal is displayed in a unit of space, and therefore it is possible to correctly provide the number of the user terminals existing in the relevant space.

Additionally, candidate positions of the user terminal are accumulated for a predetermined time period, and a current position of the user terminal is determined and displayed a current time using the accumulated candidate positions of the user terminal, which leads to solve a temporary measurement error of the positioning infrastructure device.

Furthermore, it is possible to provide a position of a user terminal in a variety of forms depending on its use, by displaying the position of the user terminal through a space map matching in case that a user requests the current position, and through a network map matching in case that a user requests a path finding up to a specific point.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

In the entire specification, when a component "comprises" or "include" an element, it means that the component does not exclude another element but further comprises other element, unless otherwise explicitly stated herein. Further, terms such as "unit", "apparatus", "module" and "block" mean a unit to process at least one of functions or operations, and they may be embodied by hardware or software or a combination thereof.

Figure 1:
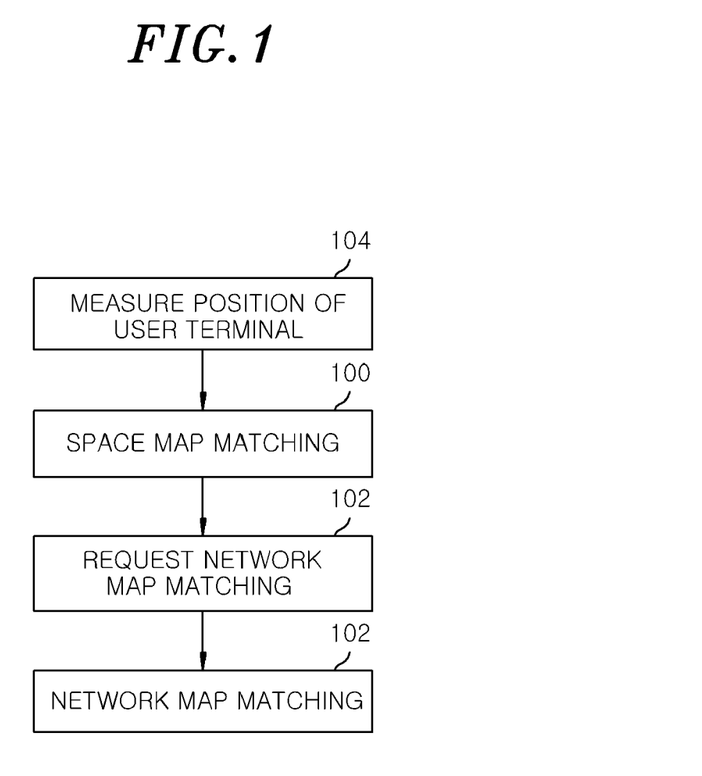
FIG. 1 is a flow chart illustrating a process to perform an indoor map matching in accordance with an embodiment of the present invention.

FIG. 1 is a flow chart illustrating a process to perform an indoor map matching in accordance with an embodiment of the present invention.

A map matching is classified into a space map matching and a network map matching. The space map matching means to display a real position of a user terminal measured through a positioning process on a map, whereas the network map matching means to match a position of a user terminal measured through a positioning process to a link or a node which constructs a space. Herein, the link or node refers to a location that is nearest to the user terminal and becomes a start point when there is a request of a path finding up to a destination of an indoor location. As such, a path finding indoors is performed not on the basis of the real position of the user terminal, but on a basis of either one of a link or node that constructs a space, which will be described in detail below.

Referring to FIG. 1, in operation 100, a position of the user terminal is measured using positioning infrastructure devices installed indoors. The process to measure the position of the user terminal using the positioning infrastructure devices will be described later.

In operation 102, the user terminal performs a space map matching.

In operation 104, the user terminal determines whether there is a request of a network map matching. The network map matching is related with a path finding indoors.

In operation 106, the user terminal performs the network map matching as requested.

Figure 2:
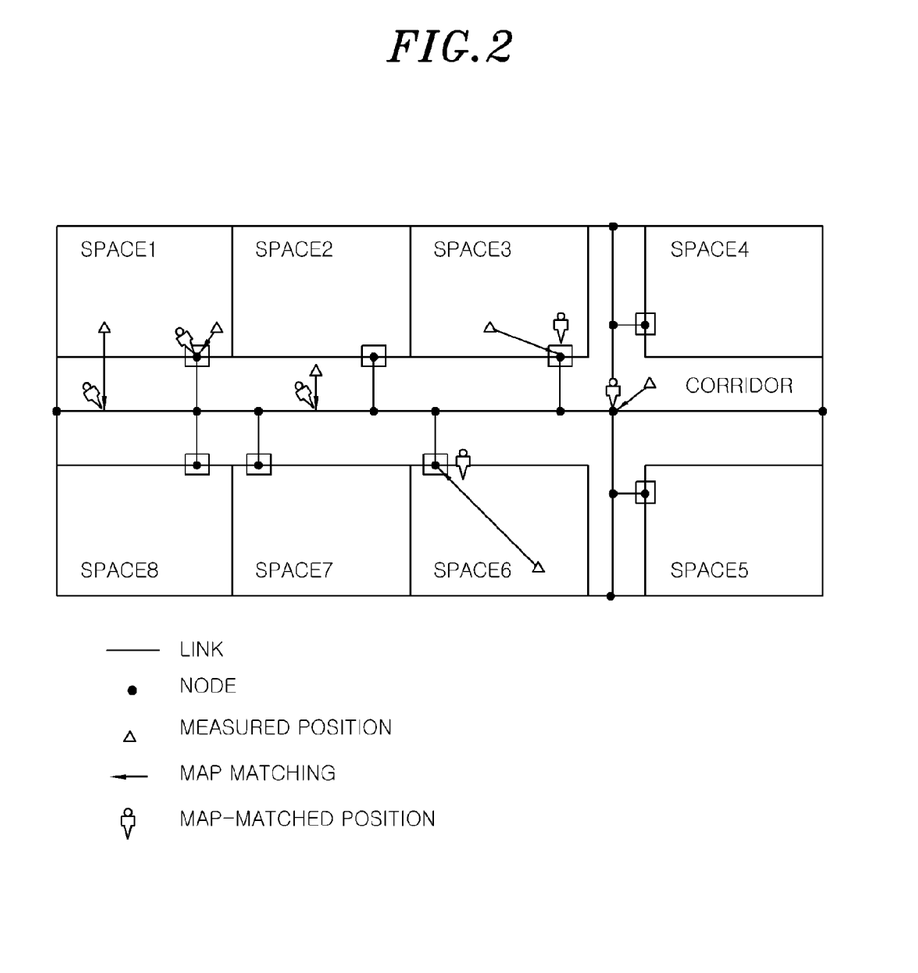
FIG. 2 is a view explaining an example of a space map matching in accordance with an embodiment of the present invention.

FIG. 2 is a view explaining an example of a network map matching and a space map matching in accordance with an embodiment of the present invention.

Referring to FIG. 2, there are shown a plurality of spaces including SPACE1, SPACE2, SPACE3, . . . , and SPACE8, and a corridor adjacent to each space. A space may be one space physically and logically. In FIG. 2, for example, the SPACE1 to SPACE3 may be one space physically, but each of them may be one of three spaces which are logically divided from one space physically. The corridor may also be one space.

Each space, SPACE1, SPACE2, SPACE3, . . . , or SPACE8, includes a node or an entry node to enter the space. Additionally, the corridor has a link. The link may be a moving passage of a user to guide the user along a searched path. For an outdoor environment, the link may be a road on which a vehicle moves, and for an indoor environment, the link may be a corridor through which a user accesses an entry node. Further, the link may have nodes. As illustrated in FIG. 2, for example, the link has nodes at a crossing of links and a point nearest to the entry node. Further, the node may include a boundary node at a point where a space is connected to another space, an entry node to enter a specific space, and an internal node that is formed within a space.

According to a conventional art, when a position of a user terminal is measured using a positioning infrastructure device, the position of the user terminal is matched to an entry node or a link. In contrast, according to the present invention, the user terminal performs either a network map matching or a space map matching depending on a request issued from a user.

The user terminal performs the network map matching when the user requests a task of a path finding. Hereinafter, the network map matching will be described first.

As illustrated in FIG. 2, a map-matched position of a user or a user terminal is indicated by a MAP-MATCHED USER POSITION of a man icon and a position of a user terminal measured using positioning infrastructure devices is indicated by a triangle. When a task requested to the user terminal is a path finding, the position of the user terminal is matched to an entry node or specific point on one link. For example, in the SPACE1, it is noted that the position of the user terminal is matched to an entry node in the SPACE1. In the SPACE3 or SPACE6, it is also noted that the position of the user terminal is matched to an entry node. Further, when the user terminal is placed at one point on the corridor, it is noted that the position of the user terminal is matched to a link on a corridor. As such, according to the embodiment, the user terminal performs the network map matching when the requested task is the path finding.

However, during the network map matching, as shown in a left side of the SPACE1, there occurs a situation that the position of the user terminal is matched to a link on a corridor even though the position is located in the SPACE1. Therefore, it is needed to provide a measurement to correctly match a real position of a user terminal to a map in an indoor space.

Hereinafter, a space map matching in accordance with the embodiment will be described.

The space map matching means to match a real position of the user terminal measured through a positioning process to an indoor map. In other words, the space map matching refers to a process of positioning the measured position of the user terminal without further processing onto the map. For example, as shown FIG. 2, the space map matching performs to indicate the measured position, which is indicated by a triangle, measured using a positioning process on an indoor map. According to the embodiment, the space map matching is performed in two phase. In a first phase, it is determined that which space the user terminal is positioned among a plurality of spaces using the positioning infrastructure devices. In a next phase, the position of the user terminal is measured in the determined space and displayed on the indoor map.

Figure 3:
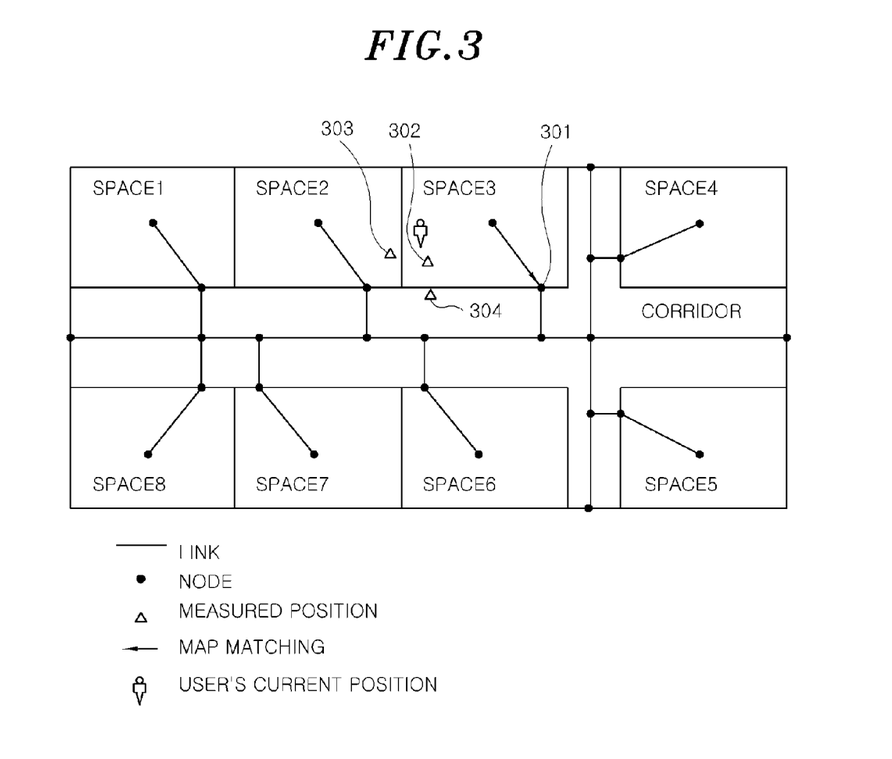
FIG. 3 is another view explaining another example of a space map matching in accordance with an embodiment of the present invention.

FIG. 3 is a view explaining another example of a space map matching suggested in the present invention.

Referring to FIG. 3, there are shown a plurality of spaces including SPACE1, SPACE2, SPACE3, . . . , SPACE8 and a corridor adjacent to each space as similar to FIG. 2. A space may be one space physically and logically. Each space includes a node or an entry node to enter the space.

When a position of a user terminal is measured at a point 302 in a space, e.g., SPACE3 at first, the measured position of the user terminal is map-matched to a specific point, e.g., an entry node 301, in the SPACE3. Thereafter, the position of the user terminal may be measured at a point 303 in the SPACE2 or a point 304 in the corridor through subsequent positioning processes. In this case, the position of the user terminal is needed to be newly map-matched to an entry node in the SPACE2 or a link on the corridor. However, such cases may occur in the positioning infrastructure device momentarily.

As such, when the poisoning device occur a momentary error when performing the positioning process, a way to correct the error to favorably perform the indoor map matching is needed. For this, the embodiment of the present invention suggests an approach to accumulate candidate positions of the user terminal measured by the positioning infrastructure device for a predetermined time period and then perform the indoor map matching using the accumulated candidate positions of the user terminal. For example, a table below indicates candidate positions of the user terminal measured at predetermined time intervals.

TABLE 1

| Measuring Time | Measured Position |
|---|---|
| T1 | SPACE3 |
| T2 | SPACE3 |
| T3 | SPACE3 |
| T4 | SPACE6 |
| T5 | SPACE3 |
| T6 | SPACE3 |
| T7 | SPACE2 |
| T8 | SPACE2 |
| T9 | SPACE3 |
| T10 | SPACE3 |
| — | |
| — | |

As can be seen from Table 1, the candidate positions of the user terminal that were accumulated for a predetermined time period are mainly found in the SPACE3, the SPACE2 and the SPACE6. It is noted that most of the candidate positions that were accumulated are related with a point 302 in the SPACE3, and the candidate positions related with the SPACE2 and SPACE6 were accumulated at most two or three, which were merely measured due to a temporary error of the positioning infrastructure device. Accordingly, it is determined that the positions of the user terminal related with the SPACE2 and SPACE6 has been erroneously measured in the positioning infrastructure device, and that the measured position of the user terminal is related with the SPACE3. Though the above description associated with FIG. 3 has been made in terms of spaces for the sake of convenience, it is preferable that it is made not in terms of space but the position of the user terminal measured actually.

Figure 4:
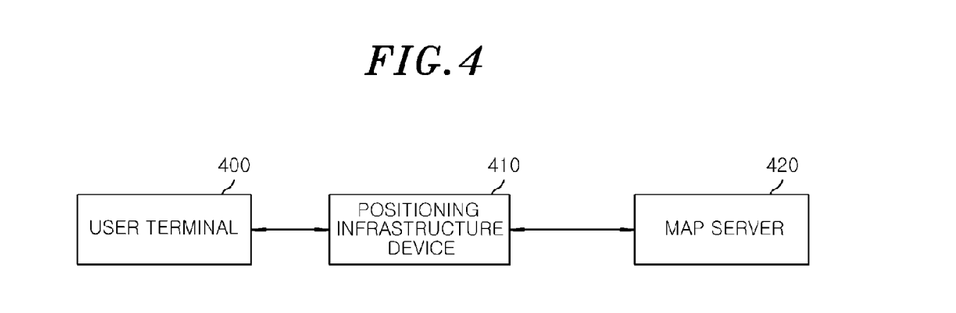
FIG. 4 is a schematic block diagram of a system for performing a space map matching in accordance with an embodiment of the present invention.

FIG. 4 is a schematic block diagram of a system for performing an indoor map matching in accordance with an embodiment of the present invention.

Referring to FIG. 4, a system for performing an indoor map matching includes a user terminal 400, a map server 420, and a positioning infrastructure device 410. It will be understood to those skilled in the art that the system of this embodiment may include another components than those described above. For example, the system may further include a GPS that provides position information of the user terminal.

The user terminal 400 is provided with an indoor map for an indoor space from the map server 420. The user terminal 400 provides with a user a position of a desired point in the indoor space or a path up to the desired point using the indoor map provided from the map server 420. The user terminal 400 may obtain a position of its own using a GPS receiver in an outdoor environment where GPS signals can be received, and using a device other than the GPS receiver in an indoor environment where the GPS signals cannot be received. For example, the user terminal 400 obtains a position of its own using the positioning infrastructure device 410 installed in an indoor space.

The user terminal 400 collects position information of one or more positioning infrastructure devices 410 and an intensity of signal received from each positioning infrastructure device 410. The collected position information and the intensity of signal are used in the map server 420 to calculate the position of the user terminal 400. Further, the position information and the intensity of signal may be downloaded from the map server 420 to the user terminal so that the user terminal 400 can calculate the position of its own.

The positioning infrastructure device 410 is installed at an indoor space in a building and the like, and communicates with the user terminal 400. The positioning infrastructure device 410 provides information requested by the user terminal 400, and if necessary, transmits information provided from the user terminal 400 to an external server. For example, the positioning infrastructure device 410 provides a map data to the user terminal 400, and receives information on a map-related service from the user terminal 400 to relay the same to the map server 420. Further, the user terminal 400 may communicate with a plurality of positioning infrastructure devices 410 and measure an intensity of the signal received from each positioning infrastructure device 410. The measured intensity of signal is then provided to the map server 420.

In accordance with the embodiment, the positioning infrastructure device 410 may be an AP (Access Point) using a Wi-Fi (Wireless Fidelity) wireless networking technical. The AP serves to as a relay between the user terminal 400 and the map server 420, as well as a positioning infrastructure device.

The positioning infrastructure device 410 relays information on the intensity of signal provided from the user terminal 400 to the map server 420. The positioning infrastructure device 410 may relay communications between the user terminal 400 and another external server other than the map server 420. For example, when information requested by the user terminal 400 is not the map-related information but other information, the positioning infrastructure device 410 may relay communications between the external server and the user terminal 400.

Though it has been shown and described in FIG. 4 that the position of the user terminal is measured using the intensity of signal received from the positioning infrastructure device, this is not limited thereto. For example, the user terminal may measure its own position using position information of the positioning infrastructure devices. That is, the user terminal may measure the position of its own by communicating with a NFC (Near Field Communication) module or by using a QR (Quick Response) code. In addition, the user terminal may measure the position of its own by communicating with the positioning infrastructure device through the use of communication methods such as Zig-bee and Bluetooth.

The map server 420 provides a variety of map-related services depending on a position of the user terminal 400. For example, the map server 420 may provide the user terminal 400 with the map-related services depending on an indoor environment or outdoor environment. Further, the map server 420 may provides the user terminal 400 with the map-related services depending on both indoor environment and outdoor environment. That is, the map server 420 provides an indoor map or outdoor map based on a position of the user terminal 400, and may provide both the indoor and outdoor maps to the user terminal if necessary. When the user terminal 400 is placed within a building, the map server 420 provides the user terminal 400 with an indoor map of the building. In this case, the map server 420 determines whether the user terminal 400 is located at an indoor or outdoor location using the position information of the positioning infrastructure device 410 that is communicating with the user terminal 400. The map server 420 calculate the position of the user terminal 400 using the intensity of signal received from the positioning infrastructure device 410 that is communicating with the user terminal 400. For this, the map server 420 stores installation information on where the positioning infrastructure device 410 is installed in the building. The map server 420 provides the calculated position of the positioning infrastructure device 410 to the user terminal 400.

The user terminal 400 performs an indoor map matching on the position of its own received from the map server 420, as illustrated in FIGS. 1 to 3. In this case, the user terminal 400 performs the network map matching when requested to do a path finding, and the user terminal 400 performs the space map matching when requested to display a current position thereof.

While it has been illustrated and described in FIG. 4 that the map server 420 measures the position of the user terminal 400, limitation is not made to this. The user terminal 400 may be provided with the position information of the positioning infrastructure device 410 as well as the map data from the map server 420. In this case, the user terminal 400 may directly calculate the position of its own by communicating with the positioning infrastructure device 410 and perform the space map matching or the network map matching on the calculated position, as illustrated in FIGS. 1 to 3.

Figure 5:
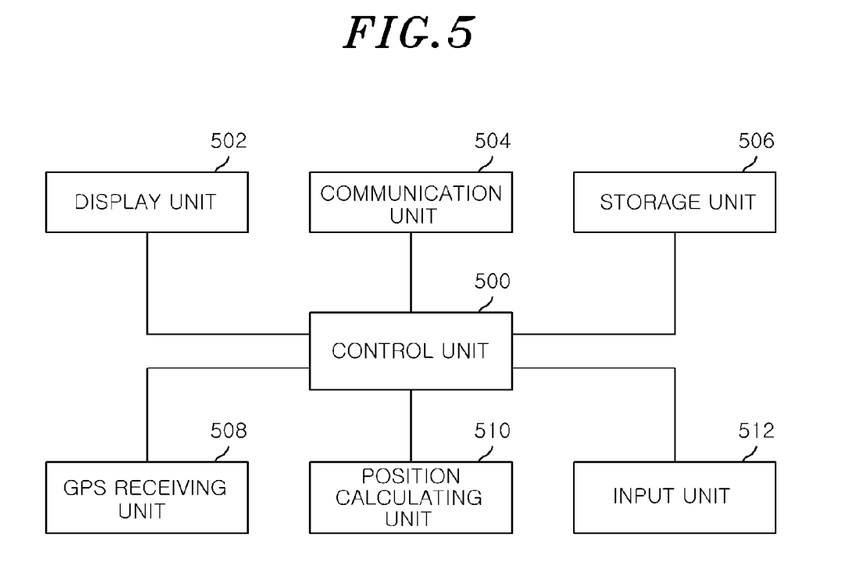
FIG. 5 is a block diagram of the user terminal shown in FIG. 4.

FIG. 5 is a block diagram of the user terminal shown in FIG. 4.

Referring to FIG. 5, the user terminal 400 includes a control unit 500, a display unit 502, a communication unit 504, a storage unit 506, a GPS receiver unit 508, a position calculating unit 510, and an input unit 512. It is also obvious that the user terminal may include components other than those described above.

The GPS receiver unit 508 communicates with GPS satellites in an outdoor environment capable of receiving GPS signals. The GPS receiver unit 508 sends communications performed with the GPS satellites to the control unit 500.

The communication unit 504 communicates with the positioning infrastructure device 410 if it is possible, and also communicates with an external server using a mobile communication network if it is not possible to communicate with the positioning infrastructure device 410. For example, the communication unit 504 may communicate with the external server using a mobile communication network depending on its settings even when it is possible to communicate with the positioning infrastructure device 410. Also, the communication unit 504 receives an indoor map to be displayed on the display unit 502 of the user terminal 400 from the map server 420.

The position calculating unit 510 calculates an intensity of signal received from each positioning infrastructure device 410 when the communication unit 504 communicates with the positioning infrastructure device 410. That is, the position calculating unit 510 communicates with one or more positioning infrastructure device 410 and calculates the intensity of signals from the positioning infrastructure devices 410. The measurement of the intensity of signals may be made at a predetermined time interval, or according to a request input from a user. As described above, the position calculating unit 510 may calculate the position of the user terminal in a variety of methods other than using the intensity of the receiving signal.

The display unit 502 displays the indoor map under a control of the control unit 500. According to the embodiment, the display unit 502 displays a result of the space map matching and the network map matching in which the position of the user terminal 400 is displayed on the indoor map.

The input unit 512 may be implemented in a form of a key board or a touch pad to receive data from a user. The display unit having a form of a touch screen may perform a function of the input unit 512. The input unit 512 receives information on an interested area from the user or a variety of information needed for a path finding and a map-related service. The input unit 512 may be integrally formed in one body with the user terminal, or may be separately equipped on the user terminal 400 if necessary.

The storage unit 506 stores information necessary to drive the user terminal 400. According to the embodiment, the storage unit 506 stores the map data received from the map server 420 and the position information of the positioning infrastructure device 410. Further, the storage unit 506 stores the position information of the user terminal 400 accumulated for a predetermined time period, as illustrated in Table 1.

The control unit 500 controls each component that constitutes the user terminal 400. The control unit 500 controls the communication unit 504 to transmit the intensity of signal measured in the position calculating unit 510 to the map server 420. The control unit 500 also receives the current position of the user terminal 400 from the map server 420 through the communication unit 504, which is derived from the intensity of signal. Further, the control unit 500 controls the display unit 504 to display the current position received from the map server 420 on the indoor map in a variety of methods.

According to the embodiment, the control unit 500 controls to calculate the position of the user terminal 400 using the position information of the positioning infrastructure device stored in the storage unit 506, and displays the calculated position on the display unit 504. According to the embodiment, the control unit 500 performs the network map matching when a path finding related task is requested, and the space map matching when simply requested to display the current position of the user terminal.

In addition, the control unit 500 controls the storage unit 506 to store the map data received through the communication unit 504. In this case, the control unit 500 may control the storage unit 506 to store 2-dimensional map data in a 2-dimensional storage space and 3-dimensional map data in a 3-dimensional storage space. The control unit 500 processes the request input through the input unit 512. That is, the control unit 500 searches for a path by the network map matching method in response to the request for the path finding received through the input unit 512, and displays the searched path through the display unit 502.

Figure 6:
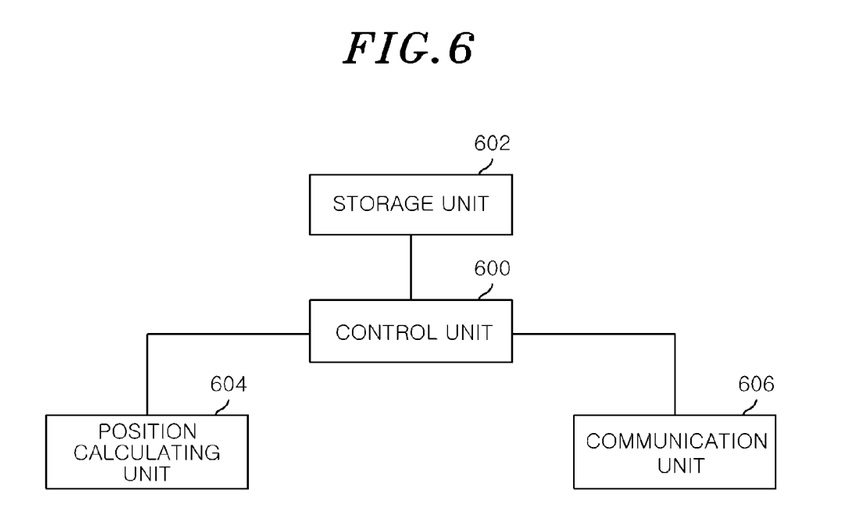
FIG. 6 is a block diagram of the map server shown in FIG. 4.

FIG. 6 is a block diagram of the map server shown in FIG. 4.

Referring to FIG. 6, the map server 420 includes a control unit 600, a storage unit 602, a position calculating unit 604, and a communication unit 606. It will be appreciated to those skilled in the art that the map server may include components other than those described above.

The communication unit 606 communicates with external devices. For example, the communication unit 606 communicates with the user terminal 400 via a mobile communication network or with the user terminal 400 via the positioning infrastructure device 410. As described above, the communication unit 606 transmits the map data to the user terminal 400 and receives information on the intensity of signal of the positioning infrastructure device 410 from the user terminal 400.

The storage unit 602 stores the 2-dimensional map data and 3-dimensional map data. The storage unit 602 may store the 2-dimensional map data and the 3-dimensional map data in separated spaces. Further, the storage unit 602 stores position information of the positioning infrastructure device 410 installed within each building or outdoor location.

The position calculating unit 604 calculates the position where the user terminal 400 is located using the intensity information of signal received through the communication unit 606 and/or the position information of the positioning infrastructure devices 410. The position calculating unit 604 provides the calculated position of the user terminal 400 through the communication unit 606 to the user terminal 400.

The control unit 600 controls the operations of the components constituting the map server 420. More specifically, the control unit 600 controls the position calculating unit 604 to calculate the position of the user terminal 400 using the intensity of signal received through the communication unit 606 and the position information of the positioning infrastructure device stored in the storage unit 602. The control unit 600 provides the position information to the user terminal 400. The map server 420 provides the position information of the user terminal to another user terminal if necessary.

While the invention has been shown and described with respect to the preferred embodiments, the present invention is not limited thereto. It will be understood by those skilled in the art that various changes and modifications may be made without departing from the scope of the invention as defined in the following claims.

What is claimed is:

1. A map server comprising:
a communication unit configured to receive an intensity of signal from a user terminal, the intensity of signal being obtained by communicating with a positioning infrastructure device;
a storage unit storing position information of the positioning infrastructure device; and
a control unit configured to measure a position of the user terminal using the intensity of receiving signal and position information of the positioning infrastructure device, and perform a space map matching or a network map matching on the position of the user terminal;
wherein the position of the user terminal is displayed in a unit of space on a map.

2. The map server of claim 1, wherein the communication unit provides a result of the space map matching or the network map matching to the user terminal.

3. The map server of claim 2, wherein the control unit performs the space map matching to display on a map in which space the user terminal is located among a plurality of spaces.

4. The map server of claim 2, wherein the control unit performs the network map matching, upon receiving a request of a path finding, in which the position of the user terminal is moved to a link or a node and displayed on the map.

5. A user terminal comprising:
a storage unit storing position information of a positioning infrastructure device;
a control unit configured to calculate a position of the user terminal using the positioning infrastructure device; and
a display unit configured to display the calculated position on a map,
wherein the user terminal is subjected to a space map matching to determine in which space the user terminal is located among a plurality of spaces based on the position of the user terminal, and
wherein the position of the user terminal is displayed in a unit of space on the map.

6. The user terminal of claim 5, further comprising:
a communication unit configured to communicate with the positioning infrastructure device or an external server; and
a position calculating unit configured to calculate an intensity of signal received from each positioning infrastructure device when the communication unit communicates with the positioning infrastructure device.

7. The user terminal of claim 5, wherein the positioning infrastructure device measures candidate positions of the user terminal and the measured candidate positions of the user terminal are accumulated for a predetermined time period.

8. The map server of claim 1, wherein the positioning infrastructure device measures candidate positions of the user terminal and the measured candidate positions of the user terminal are accumulated for a predetermined time period.

9. A system for performing an indoor map matching, the system comprising:
a user terminal configured to perform a network map matching when a path finding is requested, and perform the space map matching when displaying a current position thereof is requested;
a map server configured to provide an indoor map or outdoor map based on a position of the user terminal; and
a positioning infrastructure device configured to relay information on intensity of signal provided from the user terminal to the map server,
wherein the position of the user terminal is displayed in a unit of space on a map.

10. The system of claim 9, wherein the user terminal communicates with a plurality of positioning infrastructure devices and measures the intensity of the signal received from each positioning infrastructure device, and the measured intensity of signal is provided to the map server.

11. The system of claim 9, wherein the map server determines whether the user terminal is located at an indoor or outdoor location using position information of the positioning infrastructure device that is communicating with the user terminal.

12. The system of claim 11, wherein the map server, when the user terminal is placed within an indoor, provides the user terminal with the indoor map.

13. The system of claim 10, wherein the map server calculates the position of the user terminal using the intensity of signal received from the positioning infrastructure device.

14. The system of claim 13, wherein the user terminal calculates the position of its own by communicating with the positioning infrastructure device and performs the space map matching or the network map matching on the calculated position.

15. The system of claim 13, wherein the positioning infrastructure device measures candidate positions of the user terminal and the measured candidate positions of the user terminal are accumulated for a predetermined time period.

* * * * *